(12) United States Patent
Sheng

(10) Patent No.: US 6,819,457 B2
(45) Date of Patent: Nov. 16, 2004

(54) TRANSPARENCY ADAPTER STRUCTURE OF A SCANNER HAVING A REPLACEABLE TRANSPARENCY ADAPTER

(75) Inventor: Thomas Sheng, Hsin-Chu (TW)

(73) Assignee: Avision Inc., Hsin-Chu (TW)

( * ) Notice: Subject to any disclaimer, the term of this patent is extended or adjusted under 35 U.S.C. 154(b) by 694 days.

(21) Appl. No.: 09/874,416

(22) Filed: Jun. 6, 2001

(65) Prior Publication Data

US 2002/0135819 A1 Sep. 26, 2002

(30) Foreign Application Priority Data

Mar. 23, 2001 (TW) .................................... 90204449 U (51) Int. Cl.⁷ ................................................. H04N 1/04
(52) U.S. Cl. ...................... 358/487; 358/497; 358/475
(58) Field of Search ................................ 358/487, 509, 358/497, 494, 474, 506, 408, 483, 482; 355/67, 75; 399/211; 362/223; 361/681, 686, 683, 679; 250/208.1, 234–236; 248/220.21, 223.41, 224.51, 560, 918

(56) References Cited

U.S. PATENT DOCUMENTS

| | | | | |
|---|---|---|---|---|
| 5,119,212 A | * | 6/1992 | Mori et al. ................. | 358/474 |
| 5,251,072 A | * | 10/1993 | Fukuoka et al. ............ | 359/896 |
| 5,381,245 A | * | 1/1995 | Johnston et al. ........... | 358/487 |
| 5,467,172 A | * | 11/1995 | Liao .......................... | 399/380 |
| 5,535,021 A | * | 7/1996 | Chiang et al. .............. | 358/474 |
| 5,652,665 A | * | 7/1997 | Chen et al. ................. | 358/487 |
| 5,668,695 A | * | 9/1997 | Nakamura et al. .......... | 361/683 |
| 5,781,311 A | * | 7/1998 | Inoue et al. ................ | 358/475 |
| 5,796,576 A | * | 8/1998 | Kim .......................... | 361/683 |
| 5,986,774 A | * | 11/1999 | Han .......................... | 358/487 |
| 5,993,023 A | * | 11/1999 | Lin ............................ | 362/223 |
| 6,028,764 A | * | 2/2000 | Richardson et al. ........ | 361/681 |
| 6,078,407 A | * | 6/2000 | Ma ............................ | 358/474 |
| 6,163,385 A | * | 12/2000 | Kajander .................... | 358/475 |
| 6,172,360 B1 | * | 1/2001 | Khovaylo et al. .......... | 250/235 |
| 6,233,065 B1 | * | 5/2001 | Lee ............................ | 358/475 |
| 6,266,234 B1 | * | 7/2001 | Leman ....................... | 361/680 |
| 6,310,768 B1 | * | 10/2001 | Kung et al. ................. | 361/681 |
| 6,317,315 B1 | * | 11/2001 | Lee et al. ................... | 361/681 |
| 6,373,689 B1 | * | 4/2002 | Yim .......................... | 361/681 |
| 6,417,937 B1 | * | 7/2002 | Batten et al. ............... | 358/487 |
| 6,519,023 B1 | * | 2/2003 | Chang ........................ | 355/18 |
| 6,567,191 B1 | * | 5/2003 | Huang ....................... | 358/487 |
| 6,614,563 B1 | * | 9/2003 | Batten et al. ............... | 358/487 |

* cited by examiner

Primary Examiner—Cheukfan Lee
(74) Attorney, Agent, or Firm—Charles E. Baxley (57) ABSTRACT

A transparency adapter structure of a scanner having a replaceable transparency adapter includes a base provided with at least one pivot base. The pivot base is formed with a pivot groove. The pivot groove has a top end defining an opening. A transparency adapter is provided with at least one pivot axle. The pivot axle is movably combined with and detached from the pivot groove of the pivot base. Thus, the transparency adapter is rigidly pivoted on the base, thereby providing a positioning effect. The pivot groove has an opening for allowing detachment of the pivot axle of the transparency adapter, thereby achieving the purpose of detaching and replacing the transparency adapter.

8 Claims, 12 Drawing Sheets

TRANSPARENCY ADAPTER STRUCTURE OF A SCANNER HAVING A REPLACEABLE TRANSPARENCY ADAPTER

BACKGROUND OF THE INVENTION

1. Field of the Invention

The present invention relates to a transparency adapter structure of a scanner for scanning a transparency, and more particularly to a transparency adapter structure of a scanner with a replaceable transparency adapter.

2. Description of the Related Art

A conventional scanner has a scanning function for scanning a reflective paper. However, for scanning a transparency, for example, for scanning the positive sheet or negative sheet, the scanner needs to co-operate a transparency adapter having a light source to proceed the scanning action.

In scanning, the user has to hold the transparency adapter by his hand, with one face of the transparency adapter, which may emit light for scanning, being pressed on the glass window of the scanner, while the transparency is placed between the transparency adapter and the glass window. Thus, the scanning light emitted from the transparency adapter penetrates the transparency and the glass window, and is then received by the optical member mounted in the scanner.

The scanner may scan the transparency by use of the transparency adapter. But in the scanning process, the user's hand has to hold the transparency adapter stably so that the transparency adapter, a transparency the transparency, and the glass window may maintain a stable relationship. If the transparency adapter sways to produce a relative displacement with the transparency and the glass window, the effect for scanning the transparency is greatly affected. Thus, the scanning manner by holding the transparency adapter manually is inconvenient, and easily affects the scanning quality.

SUMMARY OF THE INVENTION

The primary objective of the present invention is to provide a transparency adapter structure of a scanner having a replaceable transparency adapter, wherein by a detachable locking assembly manner, the transparency adapter can obtain a rigid positioning effect, and can be removed to replace a different transparency adapter, thereby satisfying the requirement of the user.

For achieving the purpose, the transparency adapter structure of a scanner having a replaceable transparency adapter of the present invention includes a plate-shaped base provided with at least one pivot base. The pivot base is provided with a pivot groove. The pivot groove has a top end defining an opening. A transparency adapter is provided with at least one pivot axle. The pivot axle is movably combined with and detached from the pivot groove of the pivot base. Thus, the transparency adapter is rigidly pivoted on the base, thereby providing a positioning effect, and can be detached from the base to replace a different transparency adapter.

Next, the anti-skid pads are mounted on the bottom face of the base. Thus, when the base contacts the glass window, a relative displacement will not be produced, thereby facilitating a stable scanning effect.

In addition, different kinds of glass window made by different manufacturers have different sizes. By the anti-skid effect between the anti-skid pad and the glass window, the smaller base may be placed on the larger glass window, without incurring a relative displacement, thereby satisfying the practical requirement.

Further, the pivot groove of the pivot base has an inner wall face provided with a retaining flange. Thus, after the pivot axle of the transparency adapter is locked in the pivot groove, it is not easily detached. The inner wall face of the pivot groove of the pivot base may also be provided with an elastic locking rib, for providing a retaining effect, so that after the pivot axle of the transparency adapter is locked in the pivot groove, it is not easily detached.

In addition, the inner wall face of the pivot groove of the pivot base is provided with an inclined guide face. Thus, the pivot axle of the transparency adapter may be locked in the pivot groove easily.

Further benefits and advantages of the present invention will become apparent after a careful reading of the detailed description with appropriate reference to the accompanying drawings.

DETAILED DESCRIPTION OF THE INVENTION

Figure 1:
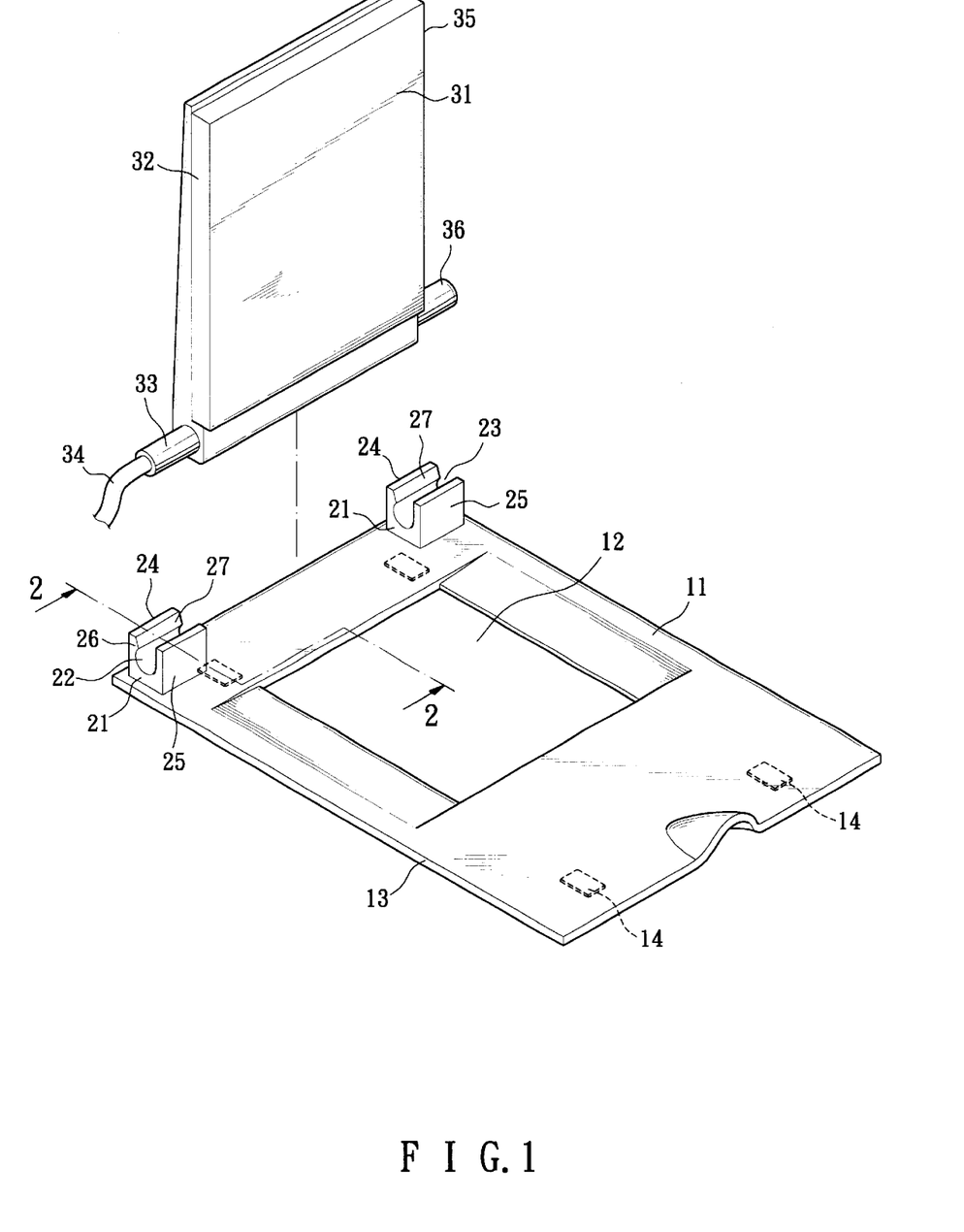
FIG. 1 is a pictorial view of a transparency adapter structure of a scanner having a replaceable transparency adapter in accordance with a first embodiment of the present invention.
Figure 2:
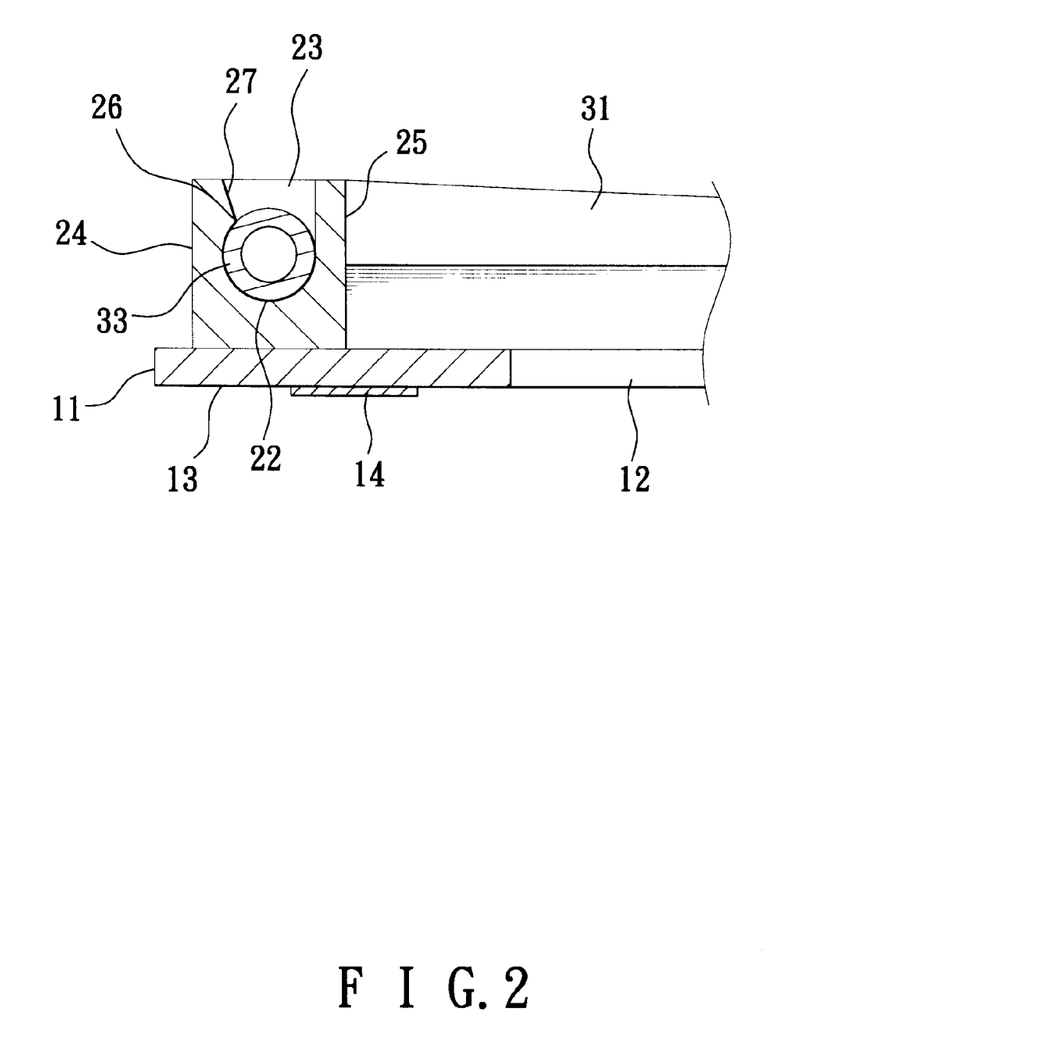
FIG. 2 is a cross-sectional assembly view of the transparency adapter structure of a scanner having a replaceable transparency adapter along line 2—2 as shown in FIG. 1.

Referring to the drawings and initially to FIGS. 1 and 2, a transparency adapter structure of a scanner having a replaceable transparency adapter in accordance with a first embodiment of the present invention includes a base 11 provided with two pivot bases 21, and a transparency adapter 31 mounted on the two pivot bases 21.

The base 11 is made into a plate, and has a surface defining a window slot 12, and a bottom face 13 provided with a plurality of anti-skid pads 14. In addition, the anti-skid pads 14 are arranged on the bottom face 13 of the base 11 evenly.

The two pivot bases 21 are oppositely secured on the base 11. Each pivot base 21 defines a pivot groove 22 whose top end is provided with an opening 23. In addition, each pivot groove 22 has a first wall 24 and an opposite second wall 25. The first wall 24 is protruded with a retaining flange 26 which is provided with an inclined guide face 27 at the top thereof.

The retaining flange 26 and the inclined guide face 27 may also be provided on the second wall 25 of the pivot groove 22 (not shown in the figure) only, or provided on the first wall 24 and the second wall 25 of the pivot groove 22 simultaneously.

The transparency adapter 31 is a device that may supply the light source for scanning. The first side 32 of the transparency adapter 31 is protruded with a pivot axle 33 through which an electric cord 34 axially passes outward. The second side 35 of the transparency adapter 31 is protruded with a pivot axle 36.

In assembly, the pivot axles 33 and 36 of the first side 32 and the second side 35 of the transparency adapter 31 are respectively aligned with the pivot grooves 22 of the pivot bases 21. Each of the pivot axles 33 and 36 may pass through the retaining flange 26 to enter the bottom of the pivot groove 22 conveniently by the guidance of the inclined guide face 27, and by the elastic expansion of the first wall 24 and the second wall 25.

When the user wants to remove the transparency adapter 31 that is pivoted on the pivot bases 21, each of the pivot axles 33 and 36 is retained by the retaining flange 26, so that the transparency adapter 31 cannot be removed easily. However, by applying a proper force, or by driving the first wall 24 of the pivot groove 22, the pivot axles 33 and 36 may be released from the pivot groove 22.

Figure 3:
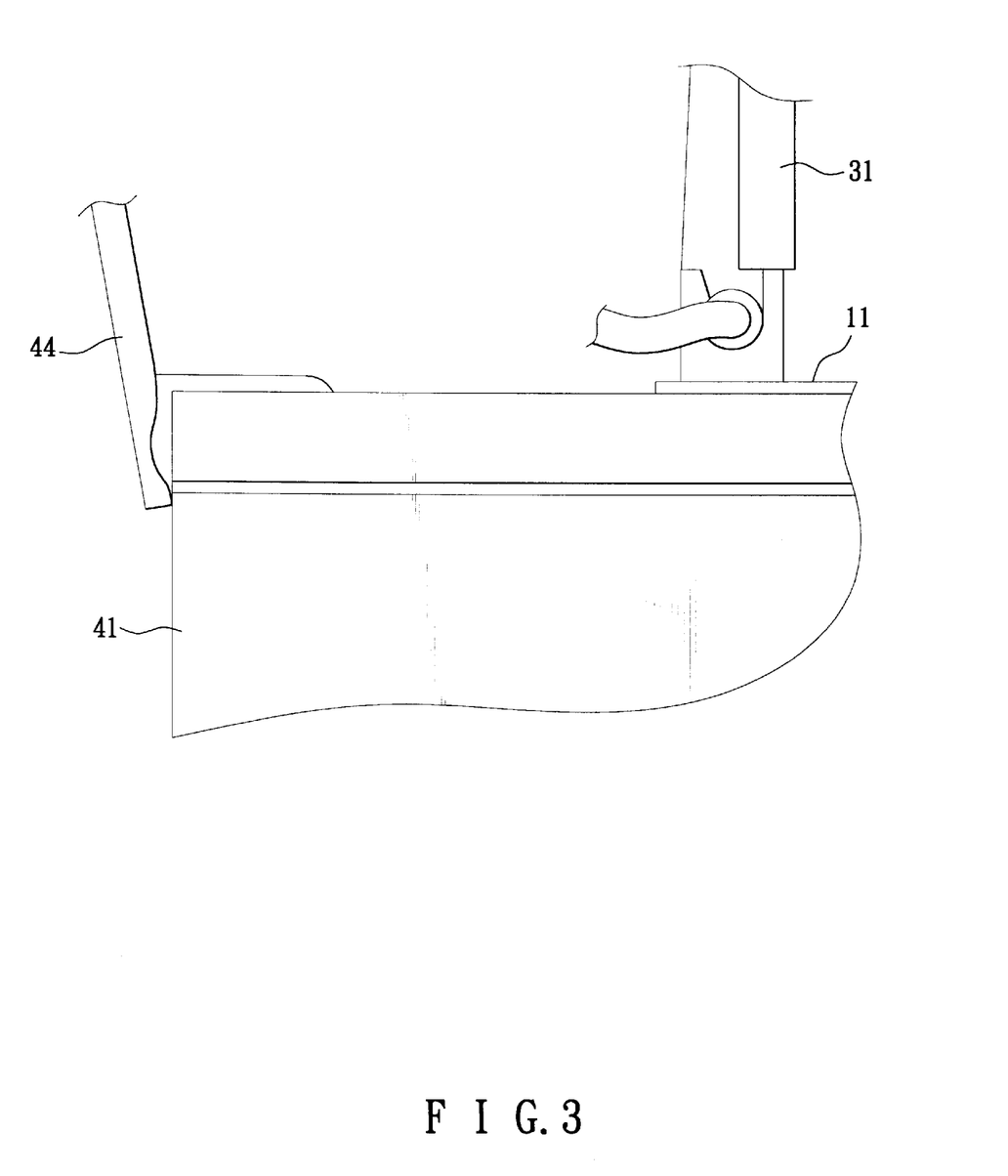
FIG. 3 is a schematic view of the transparency adapter structure of a scanner having a replaceable transparency adapter as shown in FIG. 1 in use.
Figure 4:
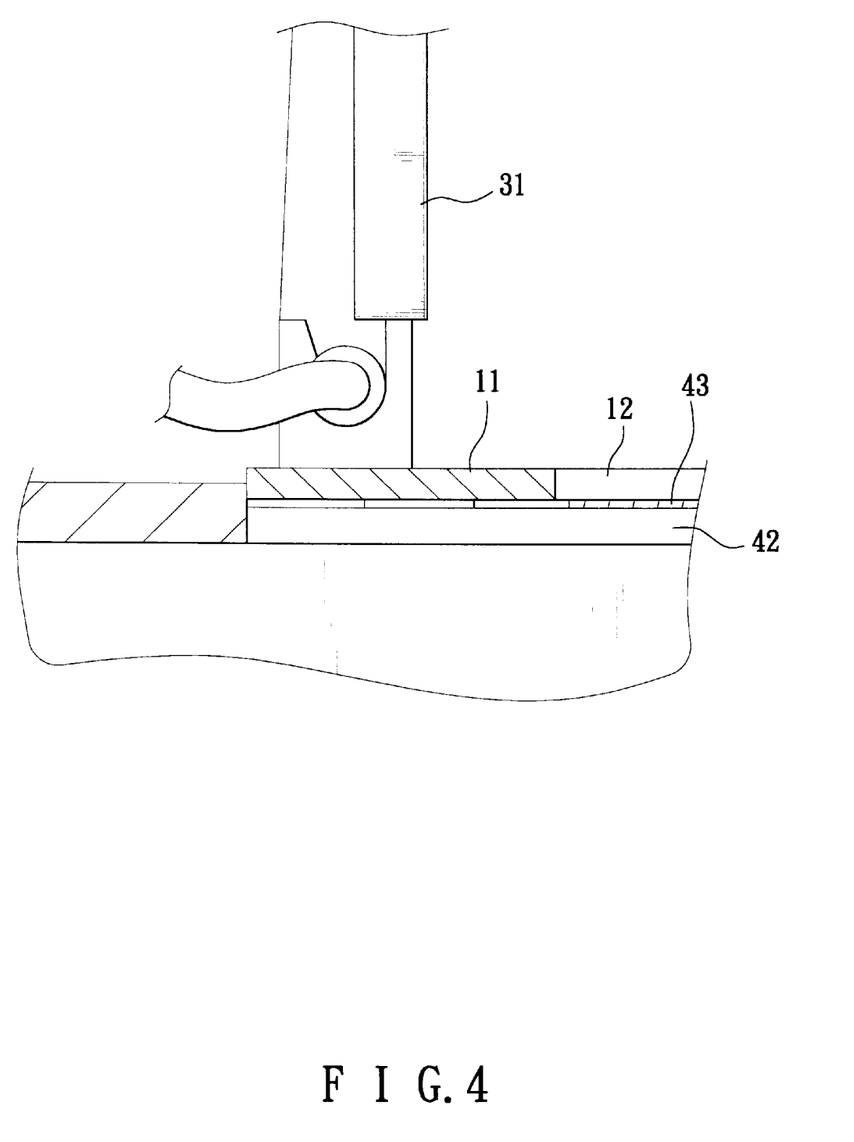
FIG. 4 is a locally enlarged schematic view of the transparency adapter structure of a scanner having a replaceable transparency adapter as shown in FIG. 1 in use.

Referring to FIGS. 3 and 4, in use, the base 11 is placed on the glass 42 of the scanner 41, and the transparency 43 is placed into the window slot 12 of the base 11. The base 11 and the transparency adapter 31 are placed on the glass window 42, so that the upper cover 44 of the scanner 41 needs not to cover the glass window 42. The upper cover 44 may be removed directly, without affecting the scanning action and result.

Figure 5:
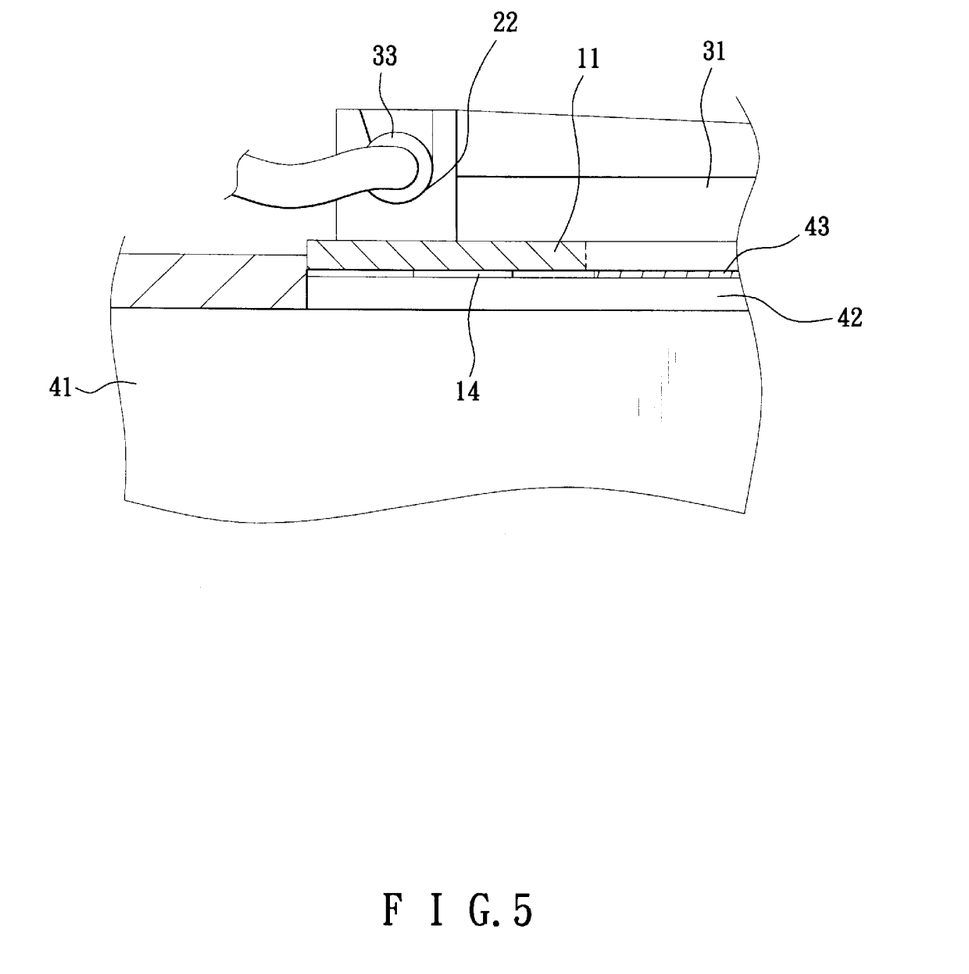
FIG. 5 is a locally enlarged schematic view of the transparency adapter structure of a scanner having a replaceable transparency adapter as shown in FIG. 1 in use.

Referring to FIG. 5, the transparency adapter 31 may be pivoted to the base 11 conveniently by the pivot relation between the pivot axle 33 and the pivot groove 22 (the other pivot axle and pivot groove are not shown), so that one face of the transparency adapter 31, which may emit light for scanning, is rested on the transparency 43. Thus, the light for scanning penetrates the transparency 43 and the glass window 42, and is then received by the optical member (not shown) mounted in the scanner 41.

Figure 6:
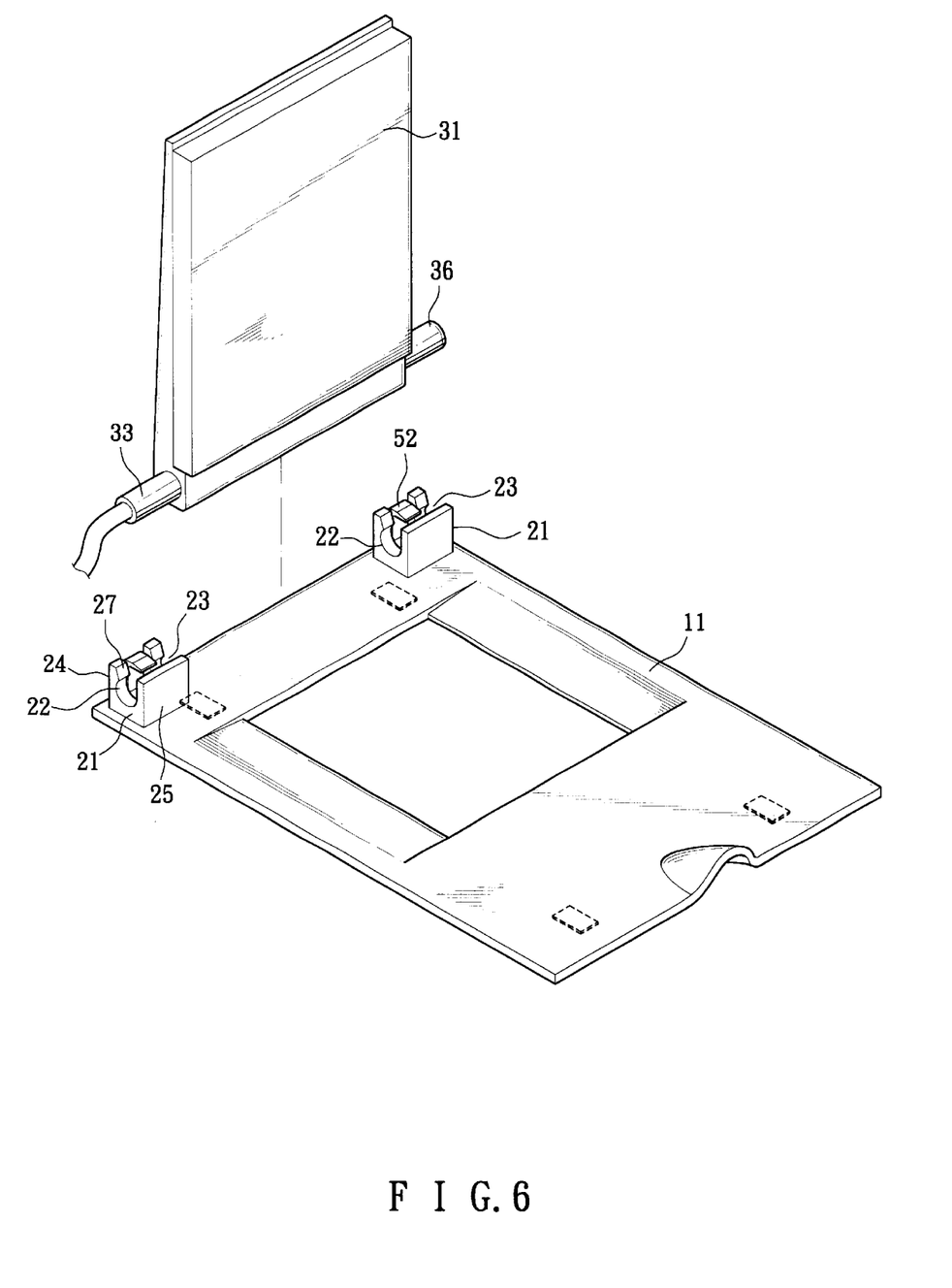
FIG. 6 is a pictorial view of a transparency adapter structure of a scanner having a replaceable transparency adapter in accordance with a second embodiment of the present invention.
Figure 7:
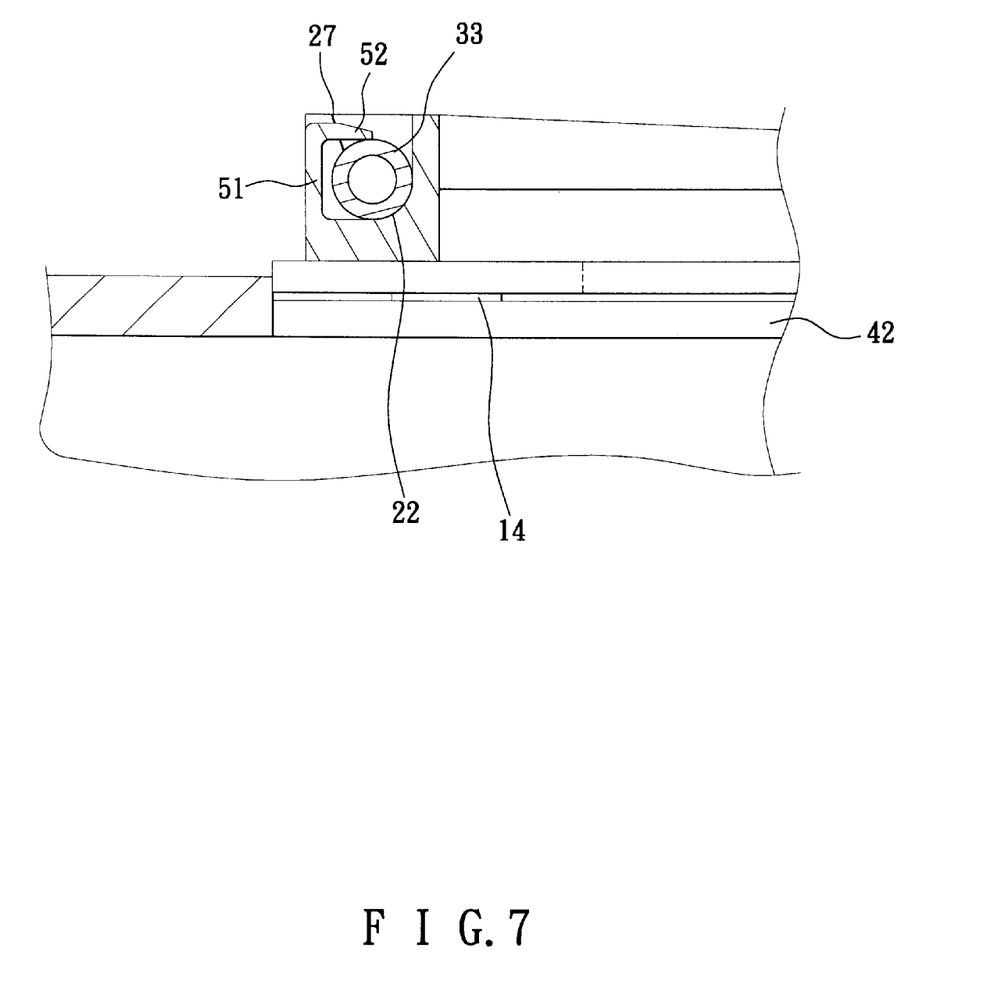
FIG. 7 is a cross-sectional assembly view of the transparency adapter structure of a scanner having a replaceable transparency adapter as shown in FIG. 6.

Referring to FIGS. 6 and 7, in accordance with a second embodiment of the present invention, the base 11 is provided with two pivot bases 21. Each pivot base 21 defines a pivot groove 22 whose top end is provided with an opening 23. The first wall 24 of the pivot groove 22 is provided with an elastic locking rib 51 which is provided with a catch edge 52 at the top thereof. The inner face of the first wall 24 is provided with an inclined guide face 27.

The second wall 25 of the pivot groove 22 may also be provided with an elastic locking rib (not shown) and an inclined guide face (not shown), or both of the first wall 24 and the second wall 25 are provided with the elastic locking rib 51.

Thus, when the pivot axles 33 and 36 of the transparency adapter 31 are to be mounted in the pivot groove 22, the pivot axles 33 and 36 of the transparency adapter 31 may displace along the inclined guide face 27, pass through the catch edge 52 of the elastic locking rib 51, and fully enter the pivot groove 22, to pivotally combine with the pivot base 21. At this time, the pivot axles 33 and 36 are retained by the catch edge 52 of the elastic locking rib 51, so that they cannot be detached easily. The pivot axles 33 and 36 can be detached from the pivot groove 22 by properly driving the elastic locking rib 51.

Figure 8:
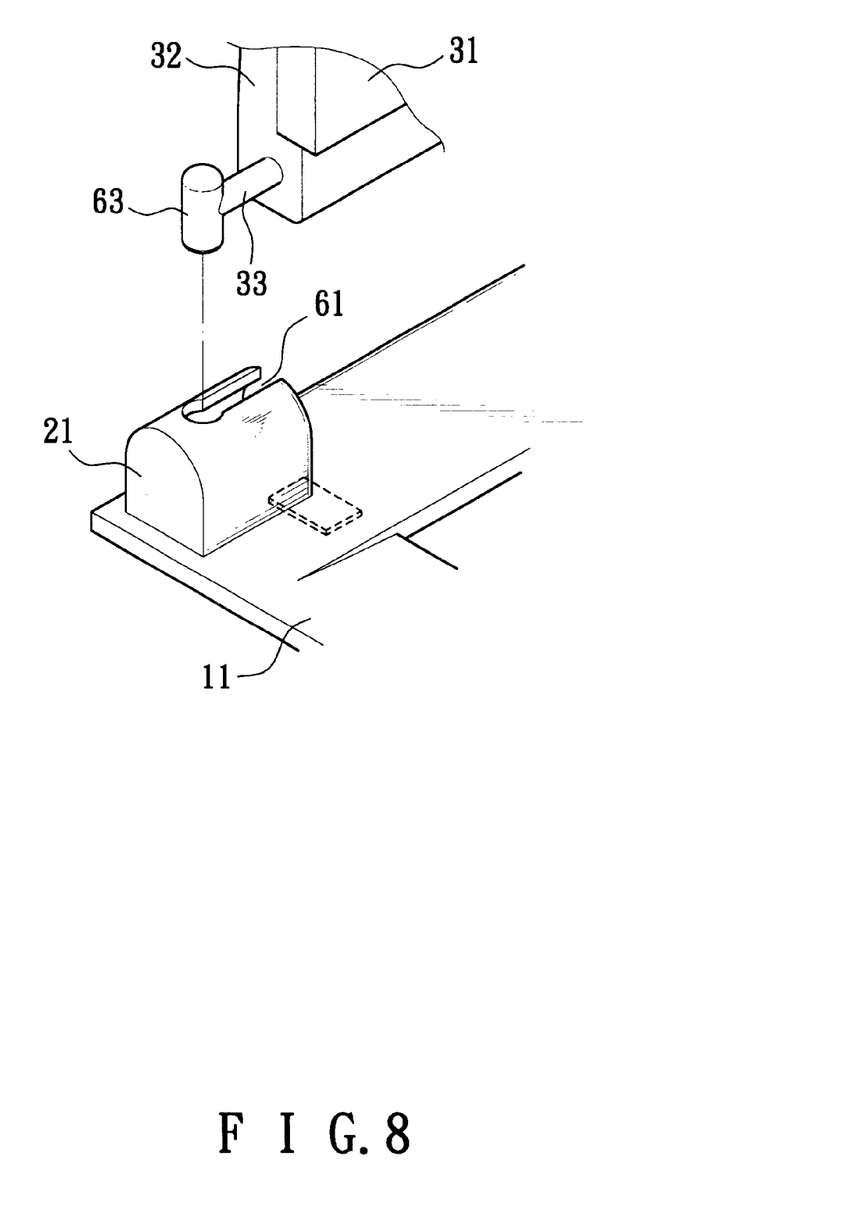
FIG. 8 is a pictorial view of a transparency adapter structure of a scanner having a replaceable transparency adapter in accordance with a third embodiment of the present invention.
Figure 9:
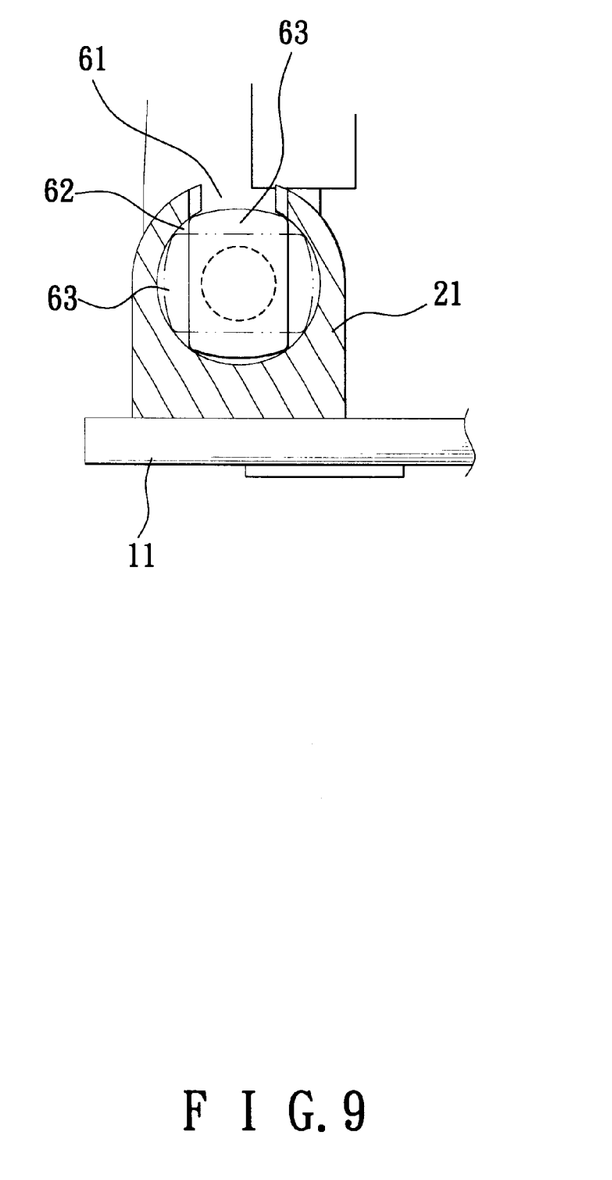
FIG. 9 is a cross-sectional assembly view of the transparency adapter structure of a scanner having a replaceable transparency adapter as shown in FIG. 8.

Referring to FIGS. 8 and 9, in accordance with a third embodiment of the present invention, the top face of the pivot base 21 of the base 11 defines an opening 61, and the inside of the pivot base 21 is formed with a pivot groove 62. The pivot axle 33 provided by the first side 32 of the transparency adapter 31 has one end provided with a locking shaft 63 perpendicular to the pivot axle 33. The second side of the transparency adapter is also provided with a pivot axle and a locking shaft perpendicular with each other which are not shown in the figures.

After the pivot axle 33 and the locking shaft 63 of the transparency adapter 31 pass through the opening 61 to enter the pivot groove 62, the locking shaft 63 is rotated from a vertical position to a horizontal position (dashed lines in FIG. 9) by rotation of the transparency adapter 31. The locking shaft 63 may be rotated in the pivot groove 62 conveniently, so that the transparency adapter 31 can be pivoted relative to the base 11 conveniently. The locking shaft 63 at the horizontal position is retained in and cannot be detached from the pivot groove 62, such that the transparency adapter 31 and the base 11 may form a rigid pivot combination.

Figure 10:
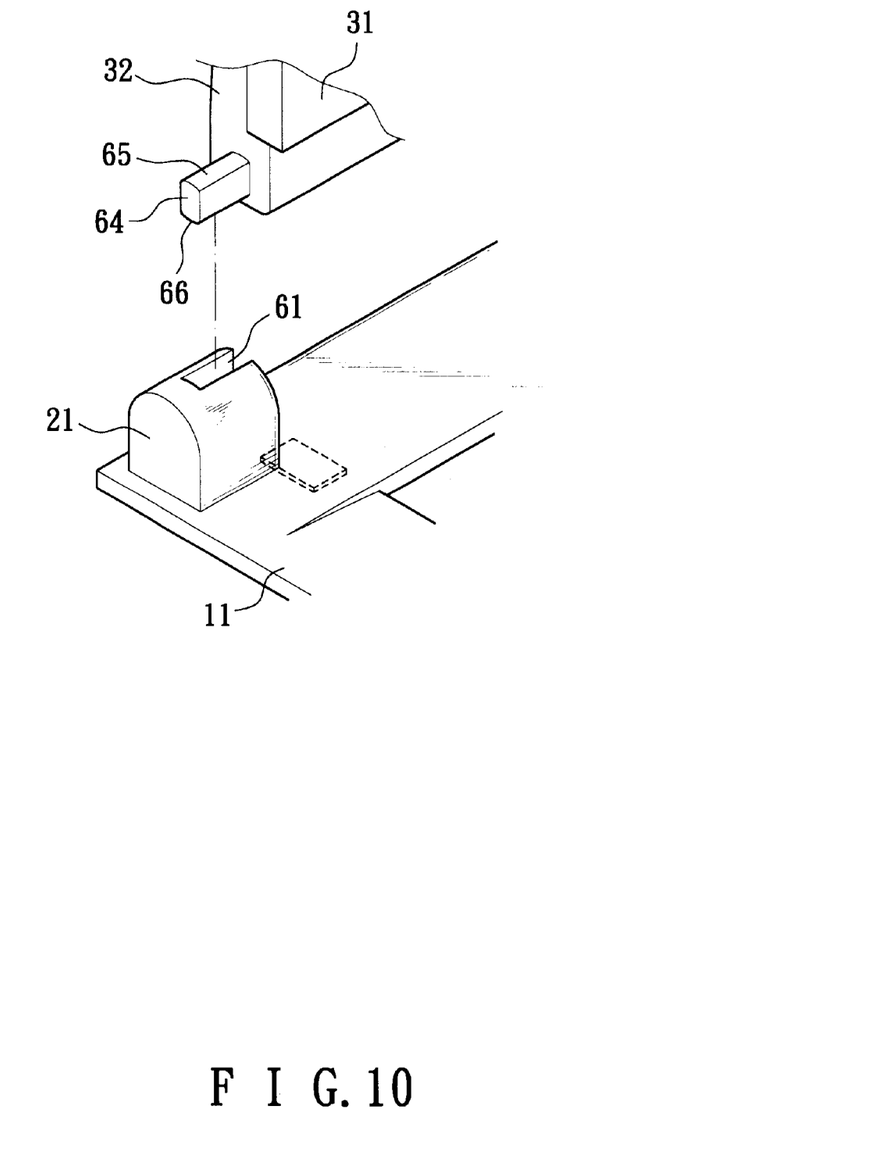
FIG. 10 is a pictorial view of a transparency adapter structure of a scanner having a replaceable transparency adapter in accordance with a fourth embodiment of the present invention.
Figure 11:
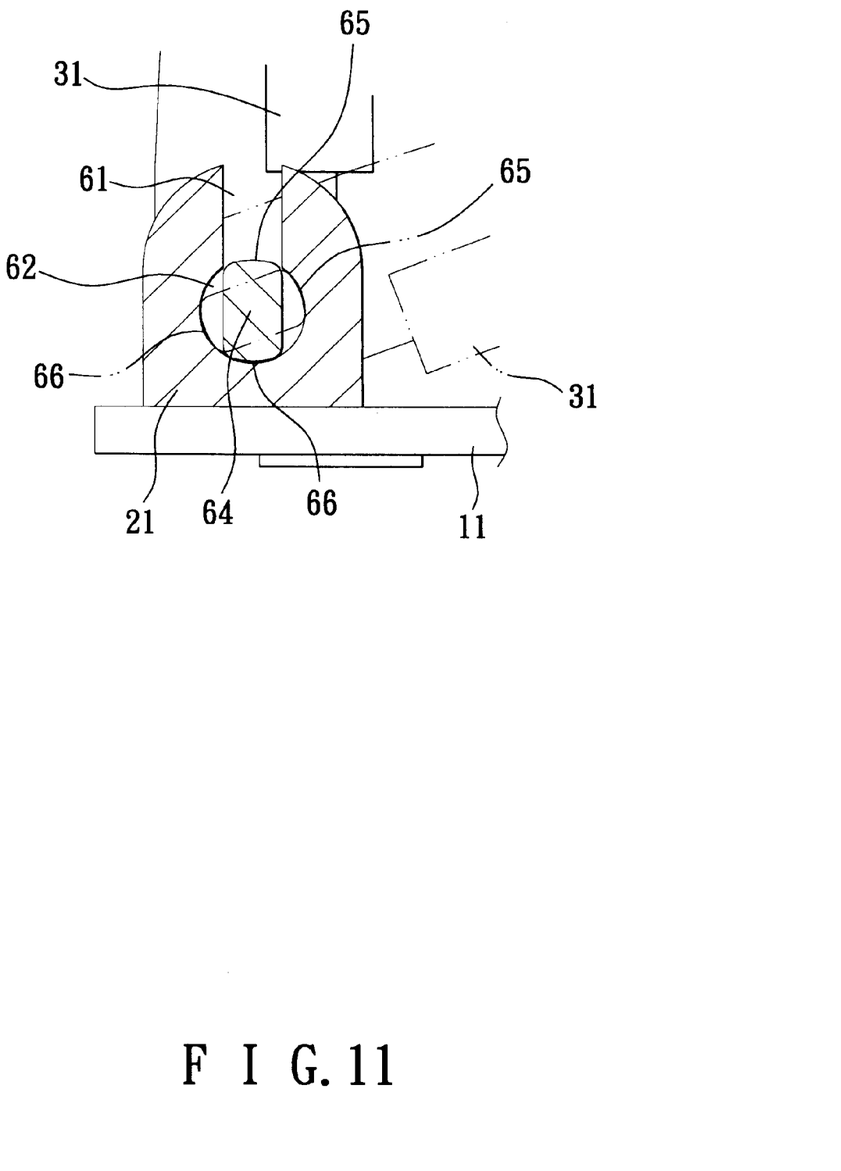
FIG. 11 is a cross-sectional assembly view of the transparency adapter structure of a scanner having a replaceable transparency adapter as shown in FIG. 10.

Referring now to FIGS. 10 and 11, in accordance with a fourth embodiment of the present invention, the first side 32 of the transparency adapter 31 is protruded with a pivot axle 64 having a rectangular rod shape. The pivot axle 64 has a first side 65 and a second side 66 each formed with an arcuate face (the second side of the transparency adapter 31 is also protruded with a pivot axle which is not shown in the figures). The pivot base 21 of the base 11 defines an opening 61, and the inside of the pivot base 21 is formed with a pivot groove 62 communicating with the opening 61. The diameter of the pivot groove 62 is greater than the width of the opening 61.

After the pivot axle 64 of the transparency adapter 31 passes through the opening 61 to enter the pivot groove 62, the pivot axle 64 is rotated in the pivot groove 62 by rotation of the transparency adapter 31. The side faces of the pivot axle 64 are arcuate, so that the pivot axle 64 can be rotated in the pivot groove 62 conveniently.

The size of the cross-sectional lengthwise portion of the pivot axle 64 is approximately equal to the diameter of the pivot groove 62, so that when the cross-sectional lengthwise portion of the pivot axle 64 is disposed at its horizontal position, the pivot axle 64 is retained in the pivot groove 62 and is locked by the end edge of the bottom of the opening 61, so that the pivot axle 64 cannot detach from the pivot base 21.

The transparency adapter 31 is pivoted with the pivot base 21 of the base 11 by a pivot structure, and the transparency adapter 31 may pivot relative to the base 11 conveniently. Thus, the user may perform the scanning action without having to hold the transparency adapter 31. The base 11 and the glass window 42 will not produce a relative displacement therebetween due to the anti-skid pads 14 mounted on the bottom face 13 of the base 11, thereby obtaining a good scanning quality.

In addition, the scanner products of different manufacturers have different sizes, so that the glass window 42 of the scanner 41 has different sizes. However, by the anti-skid pads 14 mounted on the bottom face 13 of the base 11, if the base 11 may be placed on the glass window 42, the anti-skid pads 14 of the base 11 may be tightly rested on the glass window 42, so that the base 11 can be positioned rigidly, and the user can operate the transparency adapter 31 conveniently. Thus, the present invention may satisfy requirements of each scanner, thereby enhancing the versatility thereof.

Different transparency adapters 31 have different sizes. The user may use the transparency adapters 31 having different sizes to perform the scanning work when different scanning requirements are needed. In accordance with the present invention, the transparency adapter 31 may be separated from the base 11, so that the user only needs a base 11, without having to prepare a base 11 to mate with a transparency adapter 31, thereby decreasing the cost of purchase.

Figure 12:
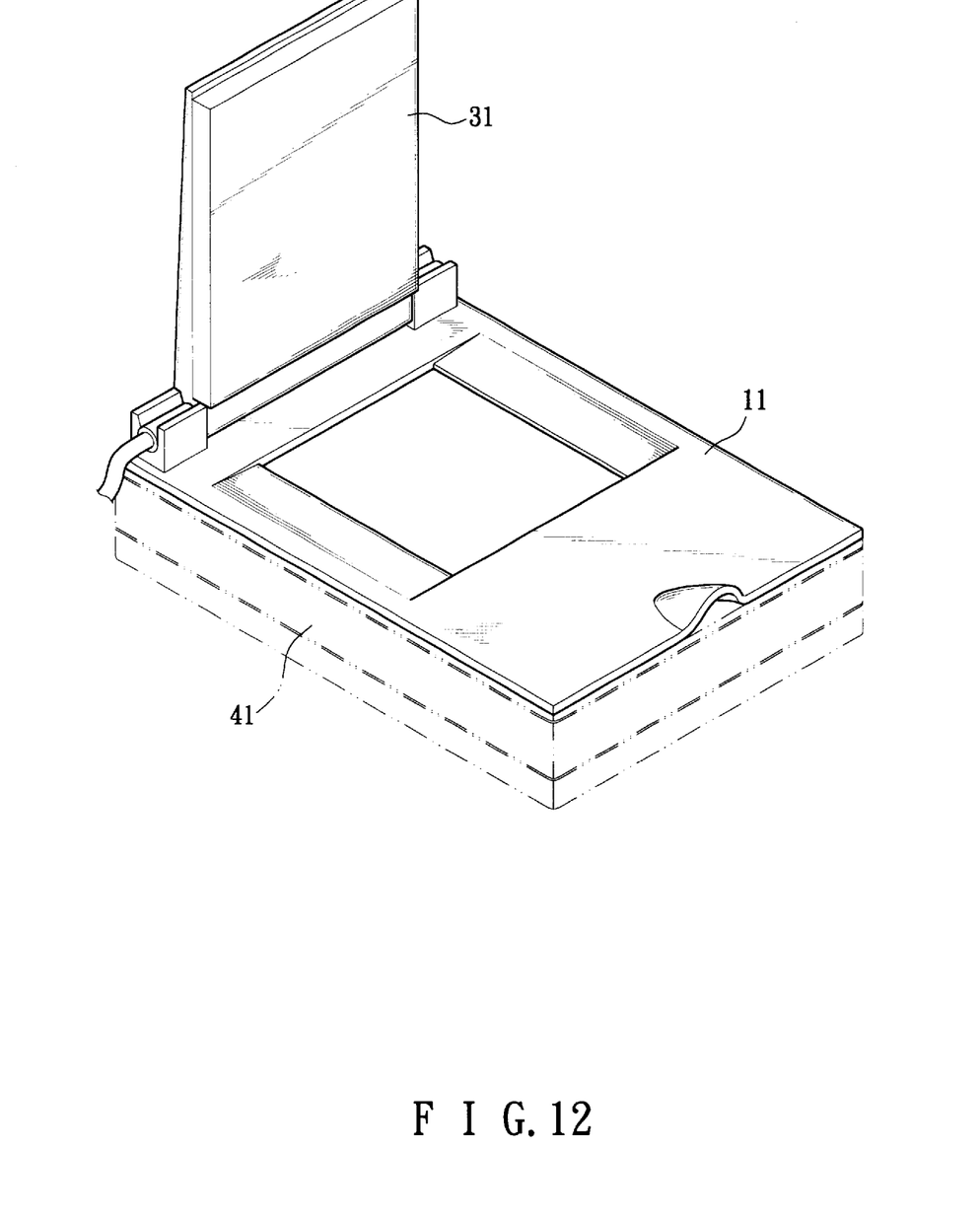
FIG. 12 is a pictorial view of a transparency adapter structure of a scanner having a replaceable transparency adapter in accordance with the present invention.

Referring to FIG. 12, the assembly of the base 11 and the transparency adapter 31 has a shade effect. Thus, the base 11 may be directly pivoted on the scanner 41, so that the assembly of the base 11 and the transparency adapter 31 can function as the paper cover on the top of the scanner 41. Thus, the transparency adapter 31 can be directly combined with the scanner 41, thereby satisfying the requirement of the consumer.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A transparency adapter structure of a scanner having a replaceable transparency adapter, comprising:
   a base, being a plate formed with a through window slot;
   at least one pivot base secured on a surface of the base and formed with a pivot groove, the pivot groove having one end defining an opening; and
   a transparency adapter provided with at least one pivot axle, the pivot axle being movably combined with and detached from the pivot groove of the pivot base.

2. The transparency adapter structure of a scanner having a replaceable transparency adapter in accordance with claim 1, wherein the pivot groove of the pivot base has an inner wall face provided with a retaining flange.

3. The transparency adapter structure of a scanner having a replaceable transparency adapter in accordance with claim 1, wherein the pivot groove of the pivot base has an inner wall face provided with an elastic locking rib.

4. The transparency adapter structure of a scanner having a replaceable transparency adapter in accordance with claim 1, wherein the pivot groove of the pivot base has an inner wall face provided with an inclined guide face.

5. The transparency adapter structure of a scanner having a replaceable transparency adapter in accordance with claim 1, wherein the base has a bottom face provided with at least one anti-skid pad.

6. The transparency adapter structure of a scanner having a replaceable transparency adapter in accordance with claim 1, wherein the pivot axle of the transparency adapter has one end provided with a locking shaft locked in the pivot groove of the pivot base.

7. The transparency adapter structure of a scanner having a replaceable transparency adapter in accordance with claim 1, wherein an assembly of the transparency adapter and the base is pivoted on a scanner, to function as a paper cover of the scanner.

8. The transparency adapter structure of a scanner having a replaceable transparency adapter in accordance with claim 1, wherein the pivot axle of the transparency adapter is made with a rectangular rod shape and has a cross-sectional lengthwise portion having a first side and a second side each being made with an arcuate shape.

* * * * *